J. M. GLEICHMAN.
Animal-Trap.
No. 218,013.  Patented July 29, 1879.
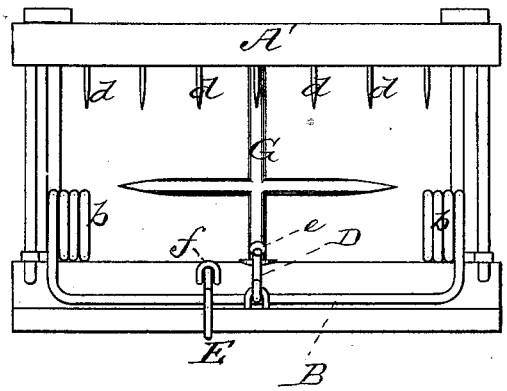
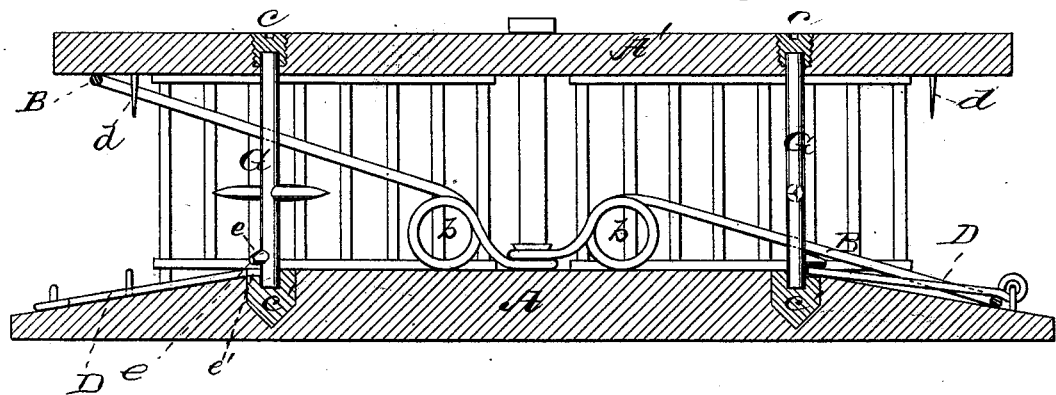
WITNESSES
Mary P. Uttey.
F. J. Masi
INVENTOR
John M. Gleichman
by E. W. Anderson
his ATTORNEY

UNITED STATES PATENT OFFICE.

JOHN M. GLEICHMAN, OF STUART, IOWA.

IMPROVEMENT IN ANIMAL-TRAPS.

Specification forming part of Letters Patent No. 218,013, dated July 29, 1879; application filed April 12, 1879.

*To all whom it may concern:*

Be it known that I, JOHN M. GLEICHMAN, of Stuart, in the county of Guthrie and State of Iowa, have invented a new and valuable Improvement in Rat-Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of an end elevation of my improved animal or rat trap. Fig. 2 is a vertical longitudinal section of the same.

This invention relates to certain improvements in rat-traps, which are easily set and which can be manipulated while being set without danger of wounding the hands, and in which the tripping of the trigger by the animal is rendered certain.

The nature of this invention consists in the employment of means for temporarily holding the bail-shaped spring or device which impales the rat upon sharpened or pointed pendants or pins depending from the top of the trap, preliminary to setting the trap; and, secondly, of a turnstile form of bait-holding device, with its lower end provided with a nib or projection, and whose lower pivotal point or socket may have one or more depressions to aid in passing the free end of the trigger or lever under said nib or projection to effect the setting of the trap, substantially as hereinafter more fully set forth.

In the accompanying drawings, A marks the bottom, and A' the top, of the trap, which are bolted together and provided with series of bars forming its sides, as shown. The bottom of the trap is beveled off or downwardly at its ends, to lessen the hinderance that might possibly be offered by the thickness of the bottom to the approaching animal or animals entering the trap.

B B are bail-shaped devices, one arranged at each end of the trap, with their inner ends coiled into springs $b\ b$, of great or considerable power or tension, which springs may be fastened, as shown, or in any other convenient way.

C C are the bait-holding devices of turnstile form, the bait being adjusted or placed upon their horizontal cross-pieces, while their upright portions or shafts fit, at the upper ends, in sockets $c$, preferably of metal, and adapted to be screwed into the top of the trap from its upper side, their lower ends being also preferably let into metallic sockets $c'$, sunk into the bottom of the trap. These bait-holding devices are arranged sufficiently in from the entrances or bails B to cause the rat, in reaching for the bait, to step or place his neck over the forward or cross pieces of the bails. This is to cause the bails or bail to strike and impale the rat upon the sharpened or pointed pins or pendants $d$ depending from the top of the trap as the animal trips the trigger, which will be presently set forth. The lower end of each post of a bait-holding device is provided with a nib or projection, $e$, while each socket $c'$ may be provided with a depression, $e'$.

D is the trigger, hooked or loosely connected to the bottom of the trap, with its free end adapted to be passed under the coincident nib or projection on the opposite bait-holding device. This is duplicated at the other end or entrance of the trap.

E is a hook, with its beak adapted to fit over or receive either edge of the entrance ends of the bottom of the trap, as shown in Fig. 1, and over the forward end of a bail, while its other end is inserted into the staple or eye $f$, fastened to the bottom of trap. This adjustment is to temporarily hold the bail down without danger of wounding the hands, which might otherwise occur by the accidentally flying or springing up of the bail during the setting of the trap. The trigger, after said adjustment, can be easily passed over the bail, and, by slightly pressing its free end downwardly, be inserted under the coincident nib $e$ of one of the bait-holding devices, when, by removing the hand from the trigger, it will be forcibly held in contact with the nib and be set. The hook E, being of no further use, is removed and safely laid away for service when again required.

It will be observed that by first placing the free end of the trigger in the depression $e'$ of the lower socket of one of the bait-holding devices until the device is turned so as to bring its nib directly over the free end of the trigger the setting of the trap is facilitated.

Having thus fully described my invention, I claim and desire to secure by Letters Patent—

1. In a rat or animal trap, the combination, with the clamping-bail B, having springs $b$, of the holding-hook E, one end of which engages the edge of the entrance end of the trap, its other end inserted into the staple or eye $f$ in the bottom of said trap, substantially as specified.

2. In a rat or animal trap, the combination, with the spring, clamping-bail B, of the turnstile C, and trigger D, engaging with a nib or projection, $e$, on the turnstile, the socket $c'$, having the depression $e'$, substantially as and for the purpose specified.

3. An animal or rat trap consisting of the spring, clamping-bail B, turnstile bait-holder C, having nib or projection $e$, and a socket with the depression $e'$, trigger D, holding-hook E, and case A A', having an eye or staple, $f$, and sharpened or pointed pins or pendants $d$, substantially as and for the purposes set forth.

In testimony that I claim the above I have hereunto subscribed my name in the presence of two witnesses.

JOHN M. GLEICHMAN.

Witnesses:
 JNO. S. LITTLE,
 J. D. COLLINS.